M. S. & J. R. CADWELL.
Grain-Drill.
No. 46,877.  Patented Mar. 21, 1865.
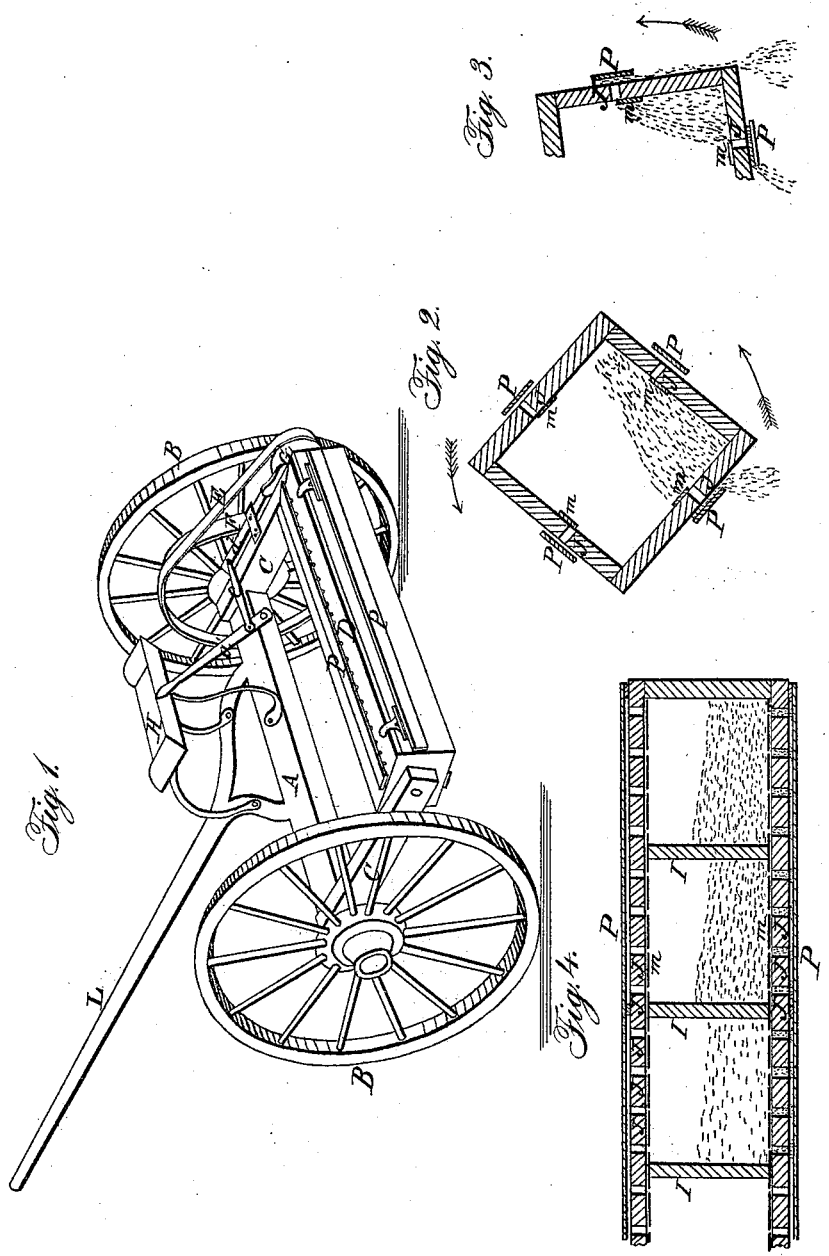
Witnesses:
George Johnson
Otto L. Johnson
Inventor:
Marvin S. Cadwell
Jason R. Cadwell

UNITED STATES PATENT OFFICE.

MARVIN S. CADWELL AND J. R. CADWELL, OF DEXTER, MICHIGAN.

IMPROVED SEEDING-MACHINE.

Specification forming part of Letters Patent No. 46,877, dated March 21, 1865.

*To all whom it may concern:*

Be it known that we, MARVIN S. CADWELL and JASON R. CADWELL, both of the township of Dexter, in the county of Washtenaw and State of Michigan, have invented certain new and useful Improvements in Broadcast Seeding-Machines; and we do hereby declare that the following is a full, clear, and exact description of the construction and operation of the same, reference being had to the annexed drawings, making a part of this specification, in which—

Figure 1 is a perspective view; Figs. 2 and 3, cross-sections of the seed-box, and Fig. 4 a partial longitudinal section.

Similar letters indicate like parts in all of the figures.

Our improvement consists, mainly, in the use of a square perforated revolving "seed-box" in connection with gaging and distributing plates.

The better to enable others skilled in the art to construct and use our invention, we will now proceed to describe it.

A represents an axle, on which the two wheels B B are hung. A wooden or cast-iron hanger, C, (projecting behind,) is firmly attached to each end of the axle-body, just inside of the wheels, which hangers are furnished at the outer ends with bearings for the journals of the revolving seed-box D, which is driven by the belt E, passing over the band-wheel F and pulley G.

L is the draft-pole.

H represents the driver's seat. The pulley G is made to run loosely on the journal-shaft, and can be locked with it, so as to revolve the seed-box by means of a common clutching arrangement, (not shown,) at the pleasure of the driver, through the intervention of the levers $a'\ a^2$, which are connected together by a rod, $e$.

The seed-box D is four-square, usually of hard, well-seasoned wood, well nailed, screwed, or bolted together, and of a capacity to contain sufficient seed or plaster, for we propose to use this machine to sow plaster as a fertilizer, as well as grain or grass seeds. One of the sides of the seed-box is made to open and shut with hinges, and is secured by lock-staples, so that it cannot fly open when in use. In order to keep the contents of the seed-box from accumulating at one end when working on uneven ground, we divide the interior into compartments by any required number of partitions, I I I. (See Fig. 4.) The seed or plaster is discharged through a row of perforations, J J J, &c., (proper distances apart,) in each side of the box, the quantity to pass through having been previously determined by the adjustment of the inside gage-plates, $m\ m\ m\ m$, which are made to enlarge or contract the orifices in the manner usually accomplished in this class of machines. Through the orifices or perforations J J, &c., the gaged seed falls upon the inside face of the distributing-plates P P P P, which are simply narrow strips of sheet metal secured in any convenient manner to the outer sides of the box, opposite the said perforations, sufficient space being left (by interposing narrow strips between, or in any other way) to allow the largest grain to pass freely between.

In relation to the use of the term "perforations" in the box, we wish to be understood as using it in the broadest sense; that we do not only mean holes of any form, but long slotted openings, the main object to be attained being the passing of the seed or plaster through the wood-work of the box in a manner least liable to clog. Should the perforations in the box consist of long narrow slots, the inner gaging-plates, $m\ m\ m\ m$, should be provided with properly-formed notches in one edge, and would require to be moved laterally, instead of longitudinally, to gage the proper quantity of seed or fertilizer. It is proper also to say, in this connection, the ranges of apertures or perforations in the gage-plates should not come opposite each other, as shown unavoidably in the cross-section, Fig. 2, but should be ranged in regular intervals.

The operation is as follows: The compartments of the seed-box D having been properly filled and the driver in his place, he first puts the box in gear by properly pushing the lever $a'$ so as to lock the pulley G with the short journal-shaft, when, on starting the team, the seed-box will begin to revolve with a moderately-rapid velocity. As the box revolves the seed or plaster is carried up by centrifugal force, until by its gravity it falls over on the contiguous side and is dusted through the apertures in the inside gage, $m$, and through the apertures in the seed-box onto the inner face of the distributing-plate P, as more clearly seen in Fig. 4. A portion of the seed or plaster is scattered on the ground as it strikes the plate P by falling over each quarter-turn of the seed-box, and what remains on the plate is very evenly distributed in the intervals by falling off from it as it assumes the several and intermediate positions in revolving, as indicated by Figs. 2 and 3. In this way the contents of the box are distributed over the ground with beautiful regularity, and clogging is rendered almost impossible under any condition of things.

We do not wish to confine ourselves strictly to the use of a rectangular-formed box; but claim the right to use any form that may best accomplish our purpose, for what we consider as the peculiar novelty of our arrangement is carrying up the seed, &c., by the rotative motion of the box, so that it may fall successively from one side to another and be dashed (after the manner of a pepper-box) through the openings in the gage-plate onto the distributing-plates, from whence the same rotative motion effectually distributes it at very regular distances apart over the ground.

We do not claim separately a revolving seed or fertilizer box for distributing seed or fertilizing material; but

What we claim as our invention, and desire to secure by Letters Patent, is—

1. The employment of the revolving seed-box D, in combination with the gage-plates $m$ $m$ $m$ $m$ and distributing-plates P P P P, substantially in the manner and for the purposes as herein specified.

2. The arrangement of plates P on a revolving box, substantially in the manner and for the purpose described.

3. The arrangement of the revolving box, constructed and operating, as described, in rear of the axle, for the purpose set forth.

MARVIN S. CADWELL.
JASON R. CADWELL.

Witnesses:
GEORGE JOHNSON,
OTTO L. JOHNSON.